United States Patent [19]

Kingsbery

[11] Patent Number: 5,226,624
[45] Date of Patent: Jul. 13, 1993

[54] ADJUSTABLE SUPPORT FOR BICYCLE SEATS

[75] Inventor: Alan S. Kingsbery, Lima, Ohio
[73] Assignee: Jane K. Kingsbery, Lima, Ohio
[21] Appl. No.: 757,241
[22] Filed: Sep. 10, 1991
[51] Int. Cl.[5] ............................................. B62J 1/00
[52] U.S. Cl. .................................... 248/219.2; 297/195
[58] Field of Search ............... 248/316.6, 219.2, 371, 248/185; 297/195, 201

[56] References Cited

U.S. PATENT DOCUMENTS

| | | | |
|---|---|---|---|
| 3,508,731 | 4/1970 | Jablonski | 248/219.2 |
| 3,891,333 | 6/1975 | Corderack | 297/195 X |
| 3,933,391 | 1/1976 | Shook | |
| 3,992,054 | 11/1976 | Campagnolo | 297/195 |
| 4,155,590 | 5/1979 | Cunningham | |
| 4,180,345 | 12/1979 | Routens | |
| 4,275,922 | 6/1979 | Juy | |
| 4,421,357 | 12/1983 | Shimano | 297/195 |
| 4,440,440 | 4/1984 | Juy | 297/195 |
| 4,502,811 | 3/1985 | Patriarca | |
| 4,568,121 | 2/1986 | Kashima | |
| 4,693,622 | 9/1987 | Borromeo | 297/195 |
| 4,783,119 | 11/1988 | Moses | |
| 4,995,753 | 2/1991 | Shook | 297/195 X |

FOREIGN PATENT DOCUMENTS 7403087 1/1975 France.
2409182 6/1979 France.

Primary Examiner—Alvin C. Chin-Shue
Attorney, Agent, or Firm—William J. Clemens

[57] ABSTRACT

A support for mounting a bicycle seat to the upper end of a support post of a bicycle frame includes a lower cradle member and a cooperating upper clamping member which are mounted on the post to hold and permit forward and rearward tilting of the seat. The cradle member has a downwardly opening post receiving slot formed therein having a curved inner wall connected to side walls extending outwardly at obtuse angles of approximately 140°. A support member formed at the upper end of the seat post has a transverse fulcrum line at the juncture of two upper surfaces inclined with respect to one another for tilting the clamping mechanism and the seat. The support member has chamfered edges formed at the ends of the fulcrum line for engaging the side walls of the post slot at diametrically opposed surfaces of engagement to prevent transverse movement of the support and the seat with respect to the seat post.

6 Claims, 2 Drawing Sheets

5,226,624

ADJUSTABLE SUPPORT FOR BICYCLE SEATS

BACKGROUND OF THE INVENTION

The present invention relates generally to bicycles and, in particular, to the clamping means for mounting a saddle or seat on the seat post of a bicycle frame.

The saddle or seat for bicycles is removably mounted on the upper end of a seat post which is fitted to the seat tube of a bicycle frame and fixed thereto at an adjustable height The angle of the seat post with respect to vertical may be slightly different from bicycle to bicycle according to the design, but it is required that the seat be fixed in place at an adjusted angle so that the seat top will be approximately horizontal irrespective of the angle of the seat post and further that the seat be angularly adjustable so as to incline the seat top downward and upward as desired by the rider.

To fulfill the adjustability requirement, the seat post is usually provided with an adjustable clamping mechanism for mounting of the bicycle seat. The bicycle seat typically has two longitudinally extending wires which are clamped to the seat post by the clamping mechanism. In the prior art, there are three primary types of clamping mechanisms used to secure the wires or saddle rails of a bicycle seat. One type of clamping mechanism used one bolt to hold and clamp the assembly. Such a mechanism is shown in the U.S. Pat. No. 3,992,054. The U.S. Pat. No. 4,275,922 shows another type of clamping mechanism using two bolts, a primary clamping bolt to clamp the assembly and a second bolt to adjust or hold the primary adjustment socket. A second type of two bolt mechanism has two bolts acting in teetertotter fashion to perform the adjustment and clamping functions as shown in the U.S. Pat. No. 3,891,333.

In the prior art, the base or cradle plate in the clamping mechanism is metal and typically has been made by stamping, casting, or forging. The more recent prior art has included the use of extruded metal components. Although the use of extruded metal components was more efficient from a manufacturing standpoint, performance problems have occurred due to the fact that the necessary tolerances to achieve the desired fit of the upper end of the post and the socket in the base of the clamping mechanism are difficult to maintain. An improper or loose fit may result in transverse shifting of the clamping mechanism and seat on the seat post.

The design of the present invention eliminates transverse shifting of the clamping mechanism. Diametrically opposed chamfered edges on the upper end of the seat post engage surfaces of the downwardly and outwardly extending side walls of a longitudinally extending slot formed in the lower cradle member of the clamping mechanism. This creates two approximately equal and opposing surface areas of engagement between the seat post and the clamping mechanism to prevent transverse shifting of the clamping mechanism and the seat without restricting the forward and rearward tilt adjustment of the seat.

SUMMARY OF THE INVENTION

The present invention concerns an adjustable saddle seat support apparatus for clamping a seat of a bicycle on the seat post of a bicycle frame. The apparatus consists essentially of providing two separate surfaces of engagement on the upper end of the seat post and a seat clamping mechanism with a downwardly opening slot to accept the top end of the post. The slot and the upper end of the seat post are dimensioned to always provide opposed surfaces of engagement which permit forward and rearward tilting of the seat about a transverse fulcrum line but prevent transverse shifting of the clamping mechanism and the seat on the post. The clamping mechanism has an upper clamping member and a lower cradle member for gripping the seat wires between them and holding the seat in position.

In the preferred embodiment, the lower cradle member is elongated and has a wire receiving cradle located laterally on each side thereof. The wires of the seat are placed in the cradles and then the upper clamping member, which is in the shape of an inverted "U", is placed on top of the lower cradle member to hold the wires of the seat in proper alignment. A mounting bolt extends upwardly through an aperture formed in the upper end of the seat post and an aperture formed in the lower cradle member and threadably engages the upper clamping member to secure the clamping mechanism to the seat post.

The upper end of the seat post is enlarged into a support member having an upper surface which is generally perpendicular to a longitudinal axis of the post, but is angled downwardly in a forward direction from a transverse fulcrum line along the crest of the support member. A portion of the edges of the upper surface are chamfered. The lower cradle member has a downwardly opening slot formed therein with side walls extending outwardly at angles corresponding to the chamfer on the support member. The end points of the transverse fulcrum line engage the lower cradle member side walls to permit tilting of the seat and the clamping mechanism in forward and rearward directions. The engagement of the chamfered edges of the support member with the side walls of the slot prevent transverse shifting motion of the seat and the clamping mechanism on the seat post.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
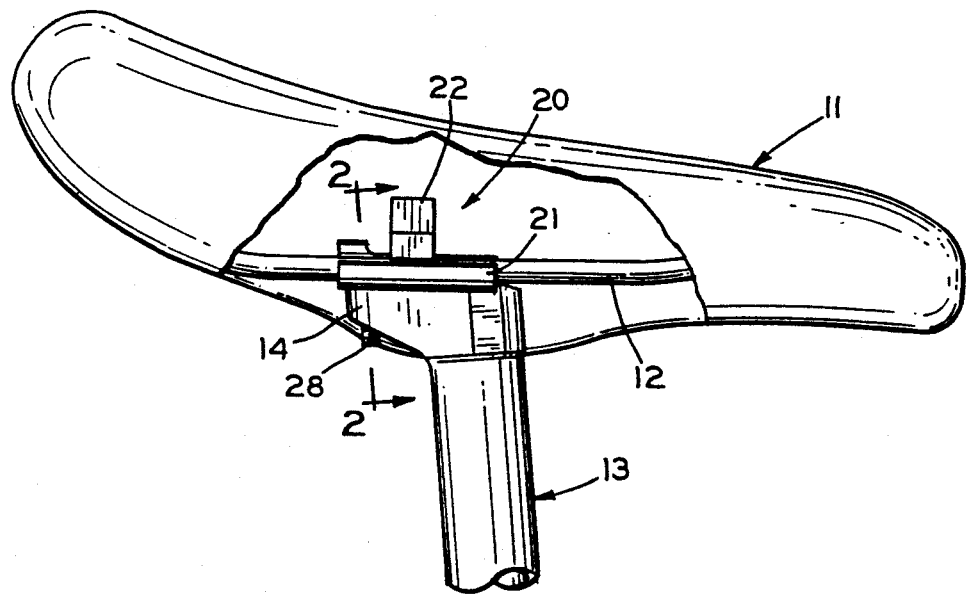
FIG. 1 is a side elevational view, partly broken away, showing a bicycle saddle mounted on a saddle support in accordance with the present invention.
Figure 2:
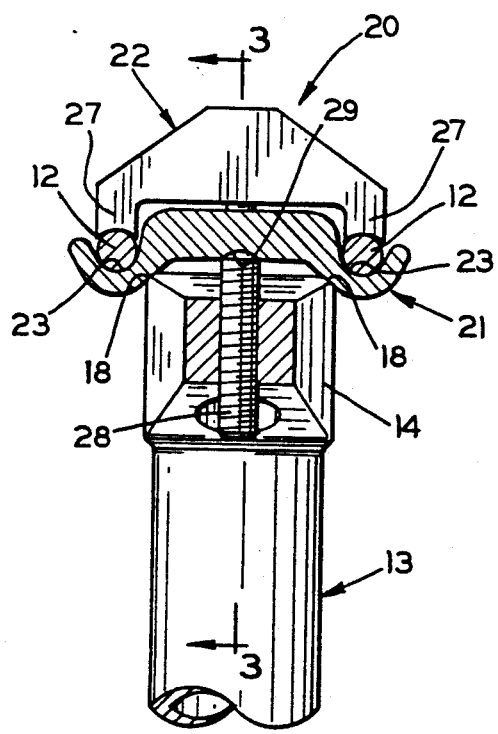
FIG. 2 is an enlarged cross sectional view taken along the line 2—2 in the FIG. 1.
Figure 3:
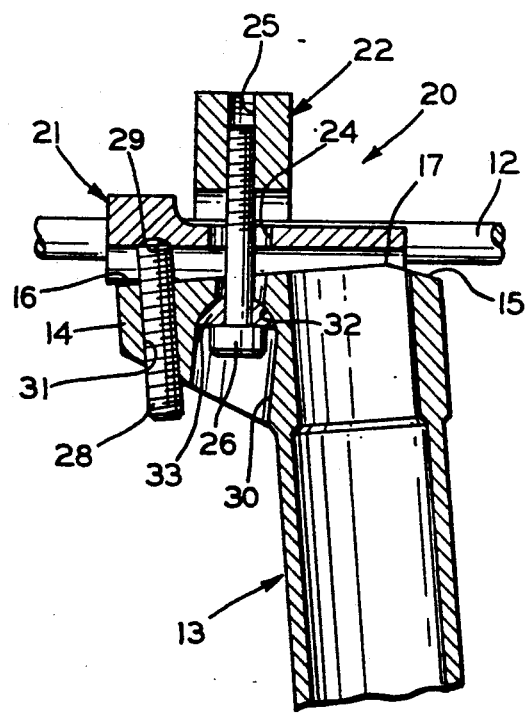
FIG. 3 is a cross sectional view taken along the line 3—3 in the FIG. 2.

There is shown in the FIGS. 1 through 3 a bicycle seat or saddle 11 of conventional construction supported on the upper end of a tubular seat post 13. The seat includes the usual pair of generally parallel, longitudinally extending wires 12 which are held by a clamping mechanism 20 attached to a support member 14 in accordance with this invention. The support member 14 is formed on the upper end of the post 13 and has an upper surface configured to permit the seat 11 to be tilted forward and rearward while preventing transverse motion. The upper surface includes a front upper surface 15 and a rear upper surface 16 which abut at a transverse fulcrum line 17 forward of a longitudinal axis of the post 13. The rear upper surface 16 extends generally perpendicular to the longitudinal axis of the seat post 13 and the front upper surface 15 extends downwardly and forwardly from the fulcrum line 17. The rear upper surface 16 has chamfered parallel edges 18 at the crest of the support member 14 extending rearwardly from the line 17 to provide surfaces of engagement about which the clamping mechanism 20 can rock to tilt the seat 11 forwardly or rearwardly.

The clamping mechanism 20 includes a lower cradle member 21 and an upper clamping member 22. The lower cradle member 21, as shown in the FIG. 4, has formed in an upper surface thereof a pair of generally parallel, longitudinally extending semi-circular cradle slots 23 located laterally at each side of the lower cradle member 21. The cradles 23 provide upwardly opening slots for receiving the wires 12. The lower cradle member 21 rests on the support member 14 at the chamfered edges 18 and is held in place as described below.

A clamping bolt 26 extends upwardly through a vertically extending oval aperture 24 formed in a central portion of the lower cradle member 21. A threaded end of the clamping bolt 26 threadably engages a threaded aperture 25 formed in the upper clamping member 22. The upper clamping member 22 has a pair of generally parallel longitudinally and downwardly extending wire engaging lugs 27 formed thereon which engage the wires 12 when they are positioned in the cradles 23 of the lower cradle member 21. The lower surfaces of the lugs 27 are radially recessed or slotted to accept the wires 12.

Figure 5:
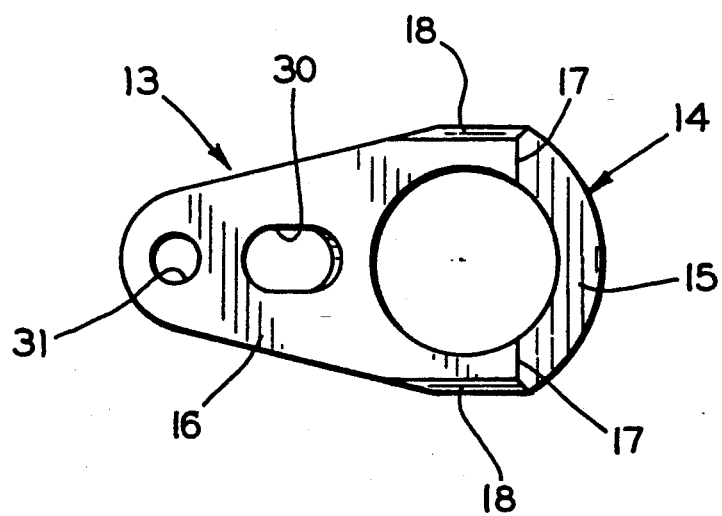
FIG. 5 is a top plan view of the support member at the top of the seat post shown in the FIGS. 1 through 3.

As shown in the FIG. 3, a head end of the clamping bolt 26 is positioned in a socket 30 formed through the support member 14. A lower portion of the socket 30 is open to a bottom surface of the support member 14 for insertion of the bolt 26. An upper portion of the socket 30 is oval, as shown in the FIG. 5, is smaller in diameter than the lower portion and is open to the rear upper surface 16. A central portion of the socket 30 has curved walls 32 for receiving a bearing 33 through which the bolt 26 extends. When the bolt 26 is tightened by threading into the aperture 25, the upper clamping member 22 is pulled against the wires 12 at the lugs 27 to clamp the seat 11 to the clamping mechanism 20 and the lower cradle member 21 is pulled against the chamfered edges 18 of the support member 14 to clamp the seat 11 and the clamping mechanism 20 to the seat post 13. The oval shapes of the aperture 24 and the upper portion of the socket 30 permit relative movement of the lower cradle member 21 and the support member 14 with respect to the bolt 26 in a longitudinal direction but prevent transverse movement to avoid side loading.

Adjustment of the lower cradle member 21 about the transverse fulcrum line 17 is accomplished by means of a jack screw 28 threaded upwardly through a threaded aperture 31 formed in the support member 14. An upper end of the jack screw 28 engages a downwardly opening recess 29 in the lower surface of the lower cradle member 21. The recess 29 can be formed as a dimple or a slot. The adjustment of the jack screw 28 results in a tilting of the lower cradle member 21 about the transverse fulcrum line 17 and the resultant tilting of the seat 11 forwardly or rearwardly on the post 13. The oval shapes of the aperture 24 and the upper portion of the socket 30 permit the lower cradle member 21 to be tilted about the fulcrum line 17 without causing movement of the bolt 26 to be restricted by contact with the sides of the oval aperture 24 and the upper portion of the socket 30.

Figure 4:
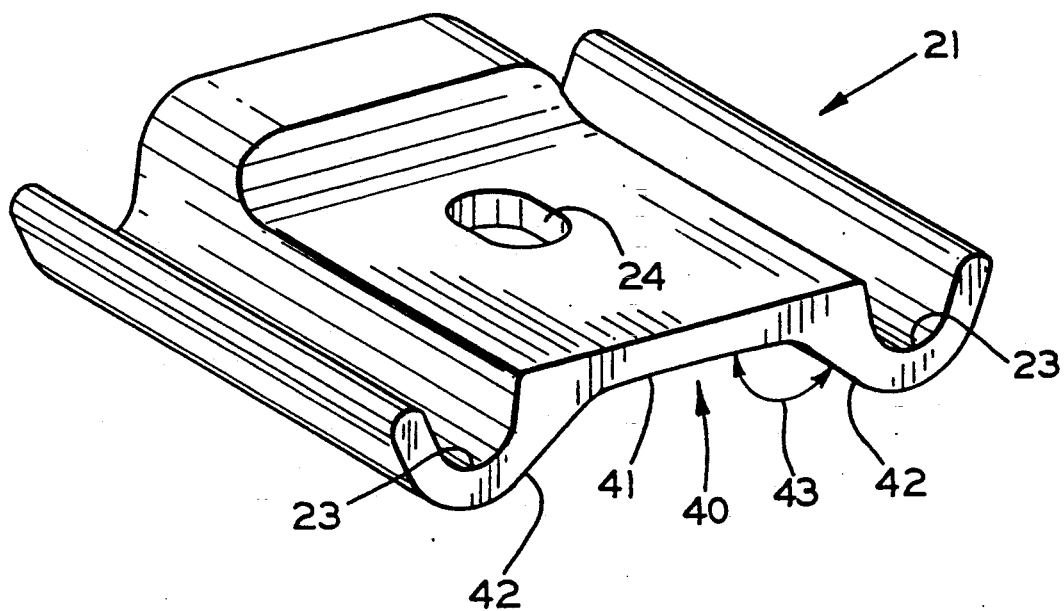
FIG. 4 is an enlarged perspective view of the lower clamping member of the clamping mechanism shown in the FIGS. 1 through 3.

The lower cradle member 21 is shown in more detail in the FIG. 4 and the support member 14 is shown in more detail in the FIG. 5. The lower cradle member 21 is designed for the optimum thickness to minimize the weight, yet provide adequate support to prevent transverse bending thereof. A socket for receiving the support member 14 is formed as a longitudinally extending, downwardly opening post slot 40 in the lower cradle member 21. The slot 40 has a generally horizontally extending curved inner wall 41 which is connected between a pair of side walls 42 which extend longitudinally and outwardly at an obtuse angle 43 of approximately 140° with respect to the horizontal. The angle 43 is complementary to the angle of incline of the chamfered edges 18 which is an included angle of approximately 140°.

The obtuse side walls 42 are designed to prevent the support member 14 from engaging the curved inner wall 41 of the post receiving slot 40. Before the jack screw 28 engages the recess 29, the lower surface of the cradle member 21 and the upper surface 16 of the support member 14 are generally parallel. The chamfered edges 18 of the support member 14 are spaced apart a distance greater than a width of the inner wall 41 which forces engagement with the obtuse side walls 42 to create diametrically opposed surfaces of engagement. The clamping mechanism 20 can pivot about the transverse fulcrum line 17 by adjusting the jack screw 28. As the clamping mechanism 20 is being pivoted, the chamfered edges 18 of the support mechanism rotate out of engagement with the obtuse side walls 42 with the exception of the points at the fulcrum line 17 which remain in engagement. The engagement of the obtuse side walls 42 of slot 40 at opposite sides of the support member 14 prevents transverse shifting of the clamping mechanism 20 and the seat 11 while permitting tilting of the seat 11 about the line 17 in a forward or rearward direction.

The design of the lower cradle member 21 and the support member 14 make it possible to produce the cradle member 21 from an extrusion of aluminum or other suitable material. By creating diametrically opposed surfaces of engagement 18, the present invention avoids the problem of transverse shifting of the seat caused by a loose fit of the upper end of the post in the post socket of the prior art clamping mechanisms.

It is apparent from the above description that a clamping mechanism has been provided which will properly support a bicycle seat for forward and rearward tilting on a bicycle frame support post, but will prevent transverse shifting on the post. In accordance with provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A support for mounting a bicycle seat on the upper end of a bicycle seat post comprising:
   a lower cradle member having a pair of longitudinally extending, upwardly opening cradle slots formed therein for receiving a pair of wires in a bicycle seat and a longitudinally extending, downwardly opening post slot formed therein for receiving an upper end of a bicycle seat, said post slot having a generally horizontally extending inner wall connected between a pair of longitudinally extending side walls, said side walls extending downwardly and outwardly at a first predetermined obtuse angle to said inner wall and said inner wall having a width of a first predetermined distance;

an upper clamping member having a pair of longitudinally and downwardly extending lugs with slots formed in lower surfaces thereof for engaging and clamping the wires of the bicycle seat in said cradle slots;

a bicycle seat post having a support member formed on an upper end thereof, said support member having a transverse fulcrum line formed by a junction of a forwardly extending front upper surface and a rearwardly extending rear upper surface inclined with respect to one another and having a pair of chamfered edge surfaces formed at a second predetermined obtuse angle at opposite ends of said fulcrum line and spaced apart a second predetermined distance greater than said first predetermined distance, said side walls engaging corresponding ones of said chamfered edge surfaces for preventing contact between said inner wall and said support member and for preventing transverse shifting of said lower cradle member with respect to said bicycle seat post;

a clamping bolt extending through an aperture formed in said lower cradle member and threadably engaging a threaded aperture formed in said upper clamping member, a head of said clamping bolt being retained in a socket formed in said support member for maintaining said cradle slots in registry with said slots formed in said lugs; and a jack screw threadably engaging a threaded aperture formed in said support member and having an upper end for engaging a recess formed in said inner wall whereby rotation of said jack screw in one direction pivots said lower cradle member about said fulcrum line and disengages said side walls from said chamfered edge surfaces except at end points of said fulcrum line.

2. The support according to claim 1 wherein said inner wall is curved.

3. The support according to claim 1 wherein said obtuse angles are approximately 140°.

4. The support according to claim 1 wherein said obtuse angles are at least 140°.

5. The support according to claim 1 wherein said aperture formed in said lower cradle member is generally oval in cross section.

6. The support according to claim 1 wherein said lower cradle member and said upper clamping member are extrusions.

* * * * *